(12) United States Patent
Lee et al.

(10) Patent No.: US 7,702,623 B2
(45) Date of Patent: Apr. 20, 2010

(54) EXTENDED CURSOR SHARING

(75) Inventors: Allison W. Lee, Sunnyvale, CA (US); Mohamed Zait, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 263 days.

(21) Appl. No.: 11/831,951

(22) Filed: Jul. 31, 2007

(65) Prior Publication Data
US 2009/0037404 A1   Feb. 5, 2009

(51) Int. Cl.
*G06F 17/30* (2006.01)
(52) U.S. Cl. .............................. 707/3; 707/6; 707/101
(58) Field of Classification Search ................ 707/1–6, 707/10, 100, 200, 101, 203
See application file for complete search history.

(56) References Cited

U.S. PATENT DOCUMENTS

| | | | |
|---|---|---|---|
| 6,529,901 B1 * | 3/2003 | Chaudhuri et al. ............. | 707/3 |
| 6,983,286 B1 | 1/2006 | Sinha et al. | |
| 6,985,904 B1 * | 1/2006 | Kaluskar et al. ............ | 707/101 |
| 7,340,452 B2 | 3/2008 | Ghosh et al. | |
| 2003/0115212 A1 * | 6/2003 | Hornibrook et al. ..... | 707/103 R |
| 2005/0119999 A1 * | 6/2005 | Zait et al. ...................... | 707/3 |
| 2006/0085375 A1 * | 4/2006 | Egan et al. ..................... | 707/1 |
| 2008/0052266 A1 * | 2/2008 | Goldstein et al. .............. | 707/2 |

OTHER PUBLICATIONS

Imre, S., "The Power of Cursor Sharing in 9i" downloaded Aug. 6, 2007 from Internet <http://www.quest-pipelines.com/newsletter-v2/cursor_sharing.htm > 4 pages.

* cited by examiner

*Primary Examiner*—Mohammad Ali
*Assistant Examiner*—Marc R Filipczyk
(74) *Attorney, Agent, or Firm*—Hickman Palermo Truong & Becker LLP; Daniel D. Ledesma (57) ABSTRACT

Techniques for sharing cursors are provided. When a new query is issued, a database server determines whether the new query is semantically equivalent to a previous query. If so, then database server computes statistics associated with the new query. Based on the statistics, the database server determines whether compiling the new query would produce an execution plan that satisfies certain criteria. If so, then the cursor is used to execute the new query. In another approach, one cursor sharing technique (CST) is used to determine which cursor to use to execute a first set of semantically-equivalent queries. Statistics are gathered during execution of the first set of queries. The database server determines, based on the statistics, when to switch from using the first CST to a different CST. The different CST is used to determine which cursor to use to execute a second set of queries that are semantically-equivalent to the first set.

20 Claims, 7 Drawing Sheets

EXTENDED CURSOR SHARING

RELATED APPLICATION

This application is related to U.S. patent application Ser. No. 11/831,952 entitled ADAPTED CURSOR SHARING, filed on Jul. 31, 2007, the contents of which are herein incorporated by this reference for all purposes as if fully disclosed herein.

FIELD OF THE INVENTION

The present invention relates to sharing cursors in a database system.

BACKGROUND

Processing queries typically comprise at least two phases—compilation and execution. During compilation, one or more database server processes perform many functions, such as parsing the query, determining what table(s), column(s), data type(s), etc., are involved, determining whether an index may be used, and generating an execution plan. This process of compilation is typically referred to as a "hard parse." The execution plan and much information utilized during the compilation stage are saved in a structure referred to as a cursor. During execution, one or more database server processes use the cursor to execute the query.

Occasionally, a query (that is issued against a database) is semantically equivalent to a previously issued query. Such a newly issued query is referred to hereinafter as the "new query." A query that is issued previous to the new query is referred to hereinafter as a "previous query."

Because so much work is involved in compilation, it would be beneficial for the new query to share the cursor that was generated for the previous query. Therefore, once a query is compiled, its cursor may be shared for subsequently issued queries that are (syntactically, or at least semantically) equivalent. Such using for a new query a cursor that was generated for a previous query is referred to as "cursor sharing."

When a new query is issued to a database system that employs cursor sharing, a stored set of previously-generated cursors are searched to determine whether a previously-generated cursor can be used by the new query. Not only does cursor sharing avoid a hard parse each time an equivalent query is executed, cursor sharing may also reduce the amount of shared memory required to store the cursors.

Cursor sharing is also useful when a new query contains one or more bind variables. A bind variable is a substitution variable that is used in place of literals. In response to receiving the following three queries (Q1, Q2 and Q3) which contain different literals:

SELECT fname, lname, pcode FROM cust WHERE id=674;
SELECT fname, lname, pcode FROM cust WHERE id=234;
SELECT fname, lname, pcode FROM cust WHERE id=332;

a database server would perform three hard parses. However, the different literals may be replaced by a bind variable to produce the following query (Q4):

SELECT fname, lname, pcode FROM cust WHERE id=:id;

Query Q4 may be issued three times. By changing the value of the bind variable each time query Q4 is issued, a user may achieve the same results as would be produced by queries Q1, Q2 and Q3. However, the database server would only perform one hard parse Q4. The second and third time Q4 is issued, the cursor generated for the first execution of Q4 would be used for the subsequent executions of Q4. Therefore, the cursor corresponding to a previous query may be reused for a new query even though different values of the bind variables are specified with the new query execution.

However, when the bind values are significantly different, cursor sharing may be suboptimal. For example, assume that a database receives the following query Q5:

```
SELECT salary
FROM emp
WHERE job_id = :bind_var
```

Further assume that, the first time query Q5 is received, the bind value of bind variable ":bind_var" is "vice_president." Based on the predicate "job_id=:bind_var," the query optimizer determines that an index should be used to retrieve the rows of an employee table (i.e., "emp") with the value of "vice_president" in the job_id column. The optimizer generates a cursor that includes an execution plan to execute the first query. In this example, only 0.01% of rows in the employee table satisfy the predicate.

The database server may then receive query Q5 again. However, the second time query Q5 is received, the bind value of bind variable ":bind_var" is "sales_rep." If the database server executes the second instance of query Q5 using the cursor that was previously-generated for the first instance of query Q5, then the index on job_id will be used, even though "sales_rep" is a relatively frequent job title (e.g., 10% of the rows in the employee table). Such use of an index is very inefficient. If the second instance of query Q5 is compiled and executed as if cursor sharing was not an option, then the query optimizer might determine that a table scan of the employee table is more efficient than utilizing the index.

Therefore, a problem with cursor sharing for queries that include bind variables is that an execution plan that is optimal for one bind value may be sub-optimal for another bind value. Thus, there is a trade-off when using bind variables in a query. Although the benefits of cursor sharing include (1) less shared memory may be consumed to store the shared cursors and (2) fewer costly hard parses are performed, one significant drawback of cursor sharing is that unpredictable run-time performance may result (e.g., depending on the bind values used to build the cursor).

Under traditional cursor sharing a user (e.g., an administrator) must determine whether to always share cursors (by using bind variables) or never share cursors (by not using bind variables).

Cursor sharing has been extended to resolve a problem with traditional cursor sharing. The solution of such cursor sharing is to make cursor sharing bind-aware for a limited class of queries, i.e., queries with predicates using user-defined operators. In this approach, a bind variable is passed as an argument to a user-defined operator, such as in the user-defined operator CONTAINS in the following query:

```
SELECT avg(e.salary), d.department_name
FROM employees e, department d
WHERE CONTAINS (e.job_id, :job)
AND e.department_id = d_department_id
GROUP BY d.department_name;
```

The user provides a cost and a selectivity function for the CONTAINS operator. The database server invokes the selectivity function of the operator based on the new bind value. The resulting selectivity value is compared to the selectivity value of an existing cursor. If the resulting selectivity value is within a range of the selectivity value of the existing cursor, then the selectivity range is extended to include the new value and the cursor is used.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for extended cursor sharing. When a new query with one or more bind variables is issued, a database server determines whether the new query is semantically equivalent to a previous query for which a cursor has already been generated. If the new query is semantically equivalent to a previous query, then the database server computes statistics associated with the new query. Based on the statistics, the database server determines whether compiling the new query would produce an execution plan that satisfies certain criteria. If so, then the database server uses the existing cursor of the previous query to execute the new query. Otherwise, the database server creates a new cursor by compiling the new query.

Various criteria may be used to determine whether to use the existing cursor for the new query. For example, the criteria may be any criteria that indicate that compiling the new query would produce an execution plan that is substantially equivalent to the execution plan associated with the existing cursor that was generated for the previous query. Such criteria include, for example, that the selectivity of bind values associated with the new query is within some predetermined range of the selectivity of bind values that were used as a basis for generating the execution plan of the existing cursor. As another example, the criteria may be that conditions that would affect the selection of an execution plan of the new query are the same as or similar to conditions that affected the selection of the execution plan of the previous query.

Techniques are provided for adaptive cursor sharing. In adaptive cursor sharing, the sharing technique for a particular cursor is changed in response to detecting certain conditions. For example, a cursor may initially be always-shared with semantically equivalent cursors. However, in response to detecting that always sharing the cursor results in vastly different execution times, the database server may switch to a technique in which the database server always performs initial tests before deciding to share the cursor. Conversely, the database server may initially always perform tests to decide whether to share a cursor. In response to detecting that compiling new queries frequently yields results similar to sharing the existing query, the database server may switch to a technique in which the cursor is always-shared with equivalent cursors.

Although a query may include multiple bind variables, for purposes of brevity, the description hereinafter refers to a query that includes a single bind variable. Embodiments of the invention are not limited with respect to the number of bind variables in a query.

Extended Cursor Sharing

According to an embodiment of the invention, before sharing an existing cursor with a new query, the database server determines whether compiling the new query would produce an execution plan that satisfies certain criteria. The process for making such a determination is referred to hereinafter as a "soft" parse, whereas the process of compiling the new query (e.g., when cursor sharing is not possible) is referred to as a hard parse.

At the time a soft parse is performed, an execution plan for the new query is not actually generated. Therefore, the execution plan that would be generated for the new query is not definitely known. However, the database is able to detect factors that would affect the execution plan of the new query. Based on those factors, the database server is able to make decisions based on the execution plan that would be produced. For example, based on those factors, the database server is able to determine whether the execution plan that would be generated for the new query is likely to be substantially equivalent to the execution plan associated with an existing cursor (referred to hereinafter as the "existing execution plan").

Typically, a cursor is only associated with a single execution plan. However, some embodiments of the invention allow multiple execution plans to be associated with a cursor. Under these circumstances, the database server may, based on the factors, determine whether the execution plan of a new query is likely to be similar to any of the execution plans of an existing query. If so, then appropriate execution plan of the existing query is used to execute the new query, instead of compiling the new query.

During a soft parse, a database server may take into account one or more factors to determine whether compiling a new query is likely to produce an execution plan that is substantially equivalent to an existing execution plan. One factor may include the selectivity of a predicate that is included in the new query. The selectivity of a predicate (e.g., sal>50000) refers to a percentage of rows of a table (including a view) that satisfy the predicate. "Low" selectivity of a predicate indicates that relatively few rows satisfy the predicate, such as 0.01%. Conversely, "high" selectivity of a predicate indicates that relatively many rows satisfy the predicate, such as 10%.

In one embodiment, not all queries are analyzed according to extended cursor sharing. Some queries (and/or their corresponding cursors) may be designated (e.g., by an administrator) as not eligible for any type of cursor sharing. In this situation, even if a new query is semantically equivalent to a previous query, a hard parse is performed and the new query is executed based on the cursor that is generated from the hard parse.

In a related embodiment, some queries (and/or their corresponding cursors) may be designated as always using cursor sharing. For example, a database server may never know the distribution of values in a column of a table. Thus, each compilation of a particular query with a predicate on that column may yield the same execution plan. In such a situation, once the database server identifies an existing cursor, that cursor is immediately used to execute a new query without determining whether compiling the new query would produce an execution plan that satisfies certain criteria.

Processing Overview

Figure 1A:
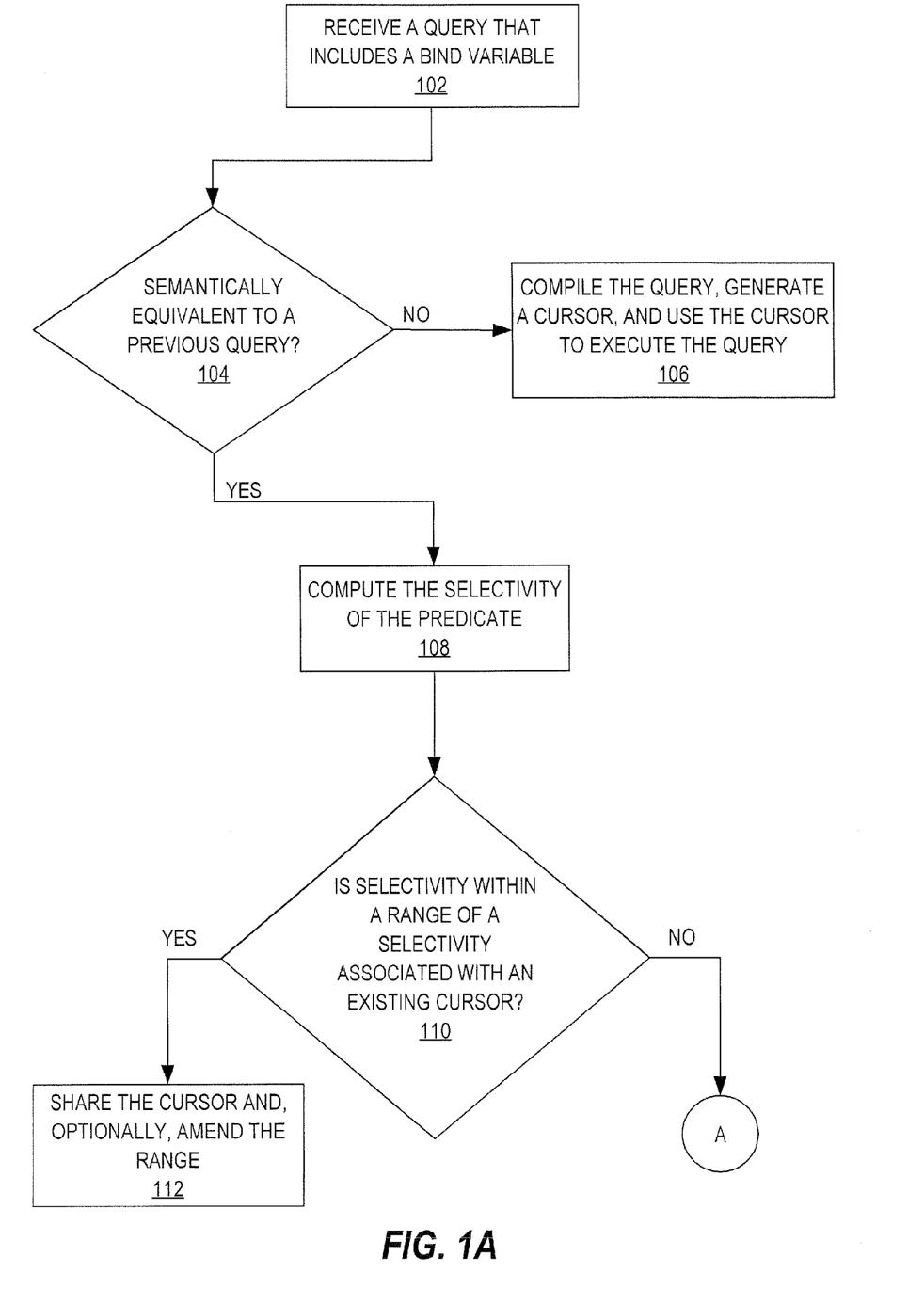
FIGS. 1A-B are flow diagrams that illustrate how a cursor may be shared using an extended cursor sharing approach, according to an embodiment of the invention.
Figure 1B:
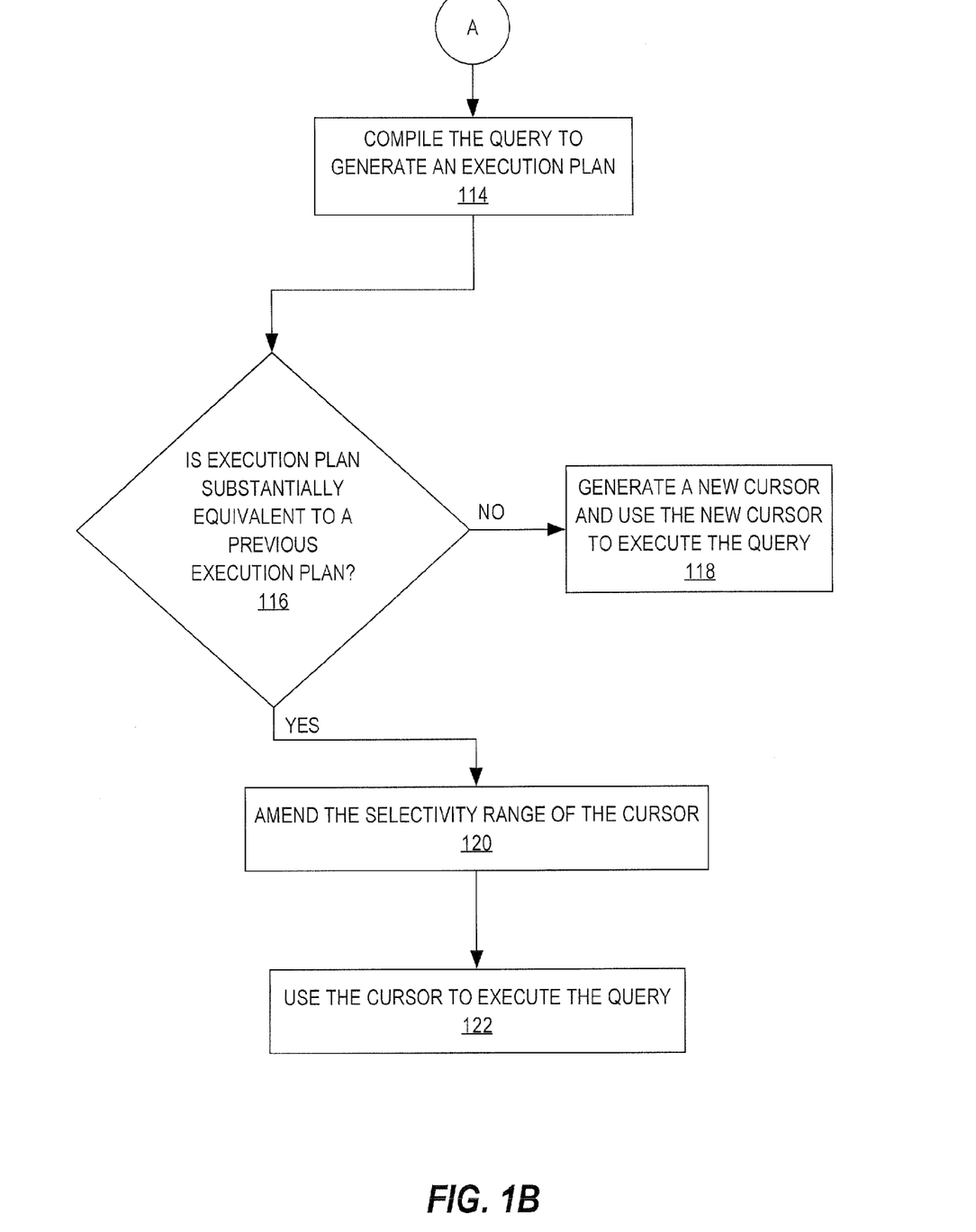

FIGS. 1A-B are flow diagrams that illustrate how a cursor may be shared using an extended cursor sharing approach, according to an embodiment of the invention. At step 102, a database server receives a new query that includes a predicate with a bind variable.

At step 104, the database server determines whether the new query is semantically equivalent to a previous query. There are numerous ways in which queries may be compared to determine whether they are semantically equivalent. For example, the actual text of each query may be compared. Alternatively, a hash value may be generated for each query. Then, hash value is used to compare corresponding queries. In a related example, each query may be normalized (such as removing extra white spaces, converting all large cap letters to small caps, etc.) before being compared.

If the new query is not semantically equivalent to a previous query, then the process proceeds to step 106 where the database server compiles the new query, generates a cursor, and executes the new query using that cursor. If the determination at step 104 is positive, then the process proceeds to step 108.

At step 108, an optimizer of the database server computes a selectivity of the predicate of the new query. The selectivity may be the actual selectivity or an estimate of the actual selectivity.

At step 110, the database server determines whether the selectivity is within a selectivity range associated with a cursor that was generated for the previous query identified in step 104. Multiple cursors may be associated with the previous query, each with a different selectivity range. If the selectivity is within a selectivity range associated with any of the one or more cursors, then the process proceeds to step 112. Otherwise, the process proceeds to step 114 (illustrated in FIG. 1B).

At step 112, the cursor identified in step 110 is shared and, optionally, the selectivity range is amended. Thus, the database server executes the new query using that cursor.

Continuing to FIG. 1B, at step 114, the database server performs a hard parse on the new query, i.e., the database server compiles the new query to generate an execution plan.

At step 116, the database server determines whether the execution plan is substantially equivalent to an execution plan of any of the one or more cursors associated with the previous query identified in step 104. If not, then the process proceeds to step 118, where a new cursor is generated and associated with the one or more cursors. If the newly generated execution plan is substantially equivalent to a previous execution plan, then the process proceeds to step 120.

At step 120, the database server amends the selectivity range of the cursor associated with the previous execution plan to at least include the selectivity of the predicate. At step 122, the database server uses that cursor to execute the new query.

By comparing selectivities of predicates associated with bind variables, an educated guess is made as to whether compiling a new query would produce an execution plan that satisfies certain criteria, e.g., by taking into account new bind values. If the educated guess is that compiling the new query would produce an identical (or near identical) execution plan, then the associated cursor is shared. If the educated guess is that compiling the new query would produce an execution plan that is very different than an existing execution plan for that query, then the new query is compiled again.

Other Factors to Consider During a Soft Parse

The above general approach may also be used to re-optimize a query based on factors in the database environment that have changed (i.e., other than the bind values). Such factors are related to the state of the database at the time the new query is issued (or, in the case of a previous query, when a corresponding cursor was generated), such as database workload, current resource utilization (e.g., memory, IO, CPU), buffer cache statistics, and the number of processes that are allocated to processing the new query. Generally, any factor that an optimizer may use to generate an execution plan may be used to determine whether compiling the new query would produce an execution plan that is substantially equivalent to an existing execution plan. Such factors may be stored in association with an existing cursor and analyzed at soft parse time to determine whether the cursor is appropriate for sharing in the current database environment.

Generally, if the state of the database system at the time of issuance of the new query is different enough from the state of the database system at the time when a corresponding cursor was generated, then a hard parse is performed on the new query. For example, a database server may determine (after a new query is found to be semantically equivalent to a previous query) that a certain number of index entries of an index reside in buffer cache. With this information, the database server may determine that an index may be used to execute the new query, whereas the database server would have determined that a table scan should be performed to execute the new query if less entries of the index resided in the buffer cache.

In cases where two states of a database system are considered different enough (similar to step 108 described previously), an execution plan is generated for the new query (similar to step 114). If the executed plan is substantially equivalent to an existing execution plan (similar to step 116), then state information stored in association with the existing cursor is modified to include information about the state of the database system at a time that the new query is processed (similar to step 120). Because the state information of the cursor is modified accordingly, if a subsequent query is issued that is semantically equivalent to the new query and the state of the database system is similar to the state of the database system at a time that the new query was analyzed, then a hard parse may not be performed.

Storing Cursors

In one embodiment, when a database server determines that a new cursor should be generated even though one or more existing cursors could have been used, the new cursor is stored in association with the one or more existing cursors referred to hereinafter as an "old cursor" or "cursor family." A cursor family is, therefore, a set of cursors that are generated based on semantically equivalent queries. Each cursor may be stored in a portion of shared volatile memory (referred to hereinafter as a "cursor cache") and/or may be stored persistently on disk.

Because multiple cursors for the same query may be generated, memory resources of the database server may be strained. Therefore, in one embodiment, a cursor is selected to be stored persistently on disk and the space in cursor cache is freed to be used for subsequently-generated cursors. Any mechanism for selecting a cursor (or cursor family) to remove from the cursor cache may be used, such as the least recently used cursor.

Figure 2:
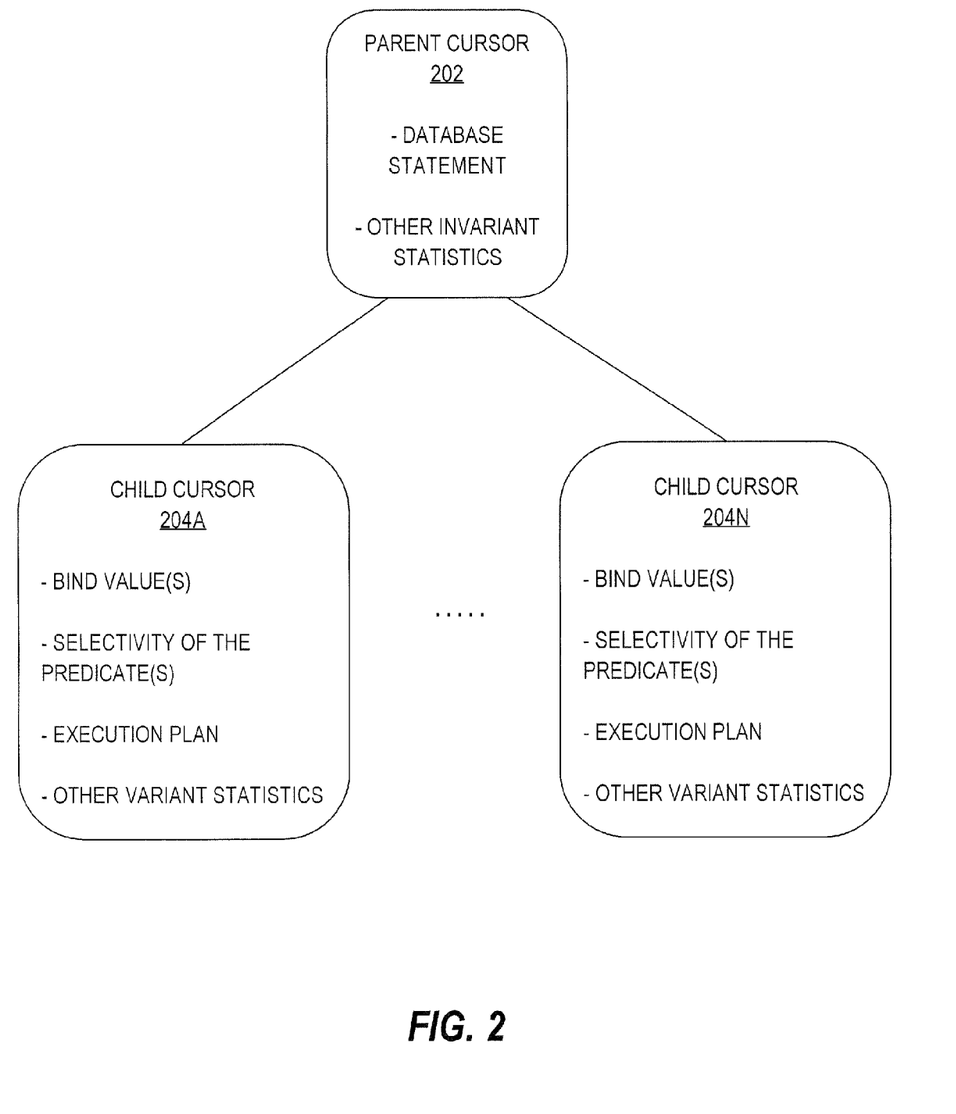
FIG. 2 is a block diagram that illustrates how multiple cursor based on the same query may be stored in association with each other, according to an embodiment of the invention.

FIG. 2 is a block diagram that illustrates how a new cursor may be stored in association with an old cursor. When a particular query is received for the first time (i.e., there are no previous queries that are semantically equivalent), a parent cursor 202 and a child cursor 204A are generated. Thereafter, for any subsequently-issued queries that are semantically equivalent to the particular query, at most one child cursor 204N is generated.

Parent cursor 202 is not a typical cursor that includes an execution plan. Instead, parent cursor 202 includes any invariant statistics associated with the particular query. Non-limiting examples of invariant statistics include the actual text of the query (or a hash value based on the actual text) and statistics of the column(s) associated with the predicate, such as the number of distinct values in the table and any histograms indicating the distribution of the various values stored in the column(s). Therefore, in step 104 described previously, only parent cursors are examined to determine whether a new query is semantically equivalent to a previous query.

Child cursors 204A-204N (referred to collectively herein as "child cursors 204") include variant statistics associated with the particular query. Each child cursor 204 is associated with a particular query of the semantically-equivalent queries. Non-limiting examples of such variant statistics of a particular child cursor 204 include: (1) one or more bind values of the corresponding query, (2) selectivity of the predicate of the corresponding query, (3) execution plan, and (4) data that indicates a characteristic, at a time when the particular child cursor was generated, that affects determination of an execution plan of the corresponding query. Steps 110, 116, 120, and 122 described previously may involve analyzing one or more of child cursors 204 of a particular parent cursor 202.

Selectivity Ranges

In one embodiment, each cursor that is eligible for sharing (e.g., a subset of child cursors 204) includes at least one of a selectivity or a selectivity range. A selectivity range may be continuous or discontinuous. If a selectivity of a predicate of a new query is within a selectivity range associated with a particular child cursor 204, then the particular child cursor 204 is selected as the cursor to use to execute the new query.

Many techniques may be used to determine the selectivity of a predicate. Embodiments of the invention are not limited to any particular technique. For example, a full scan of a pertinent table may determine the actual selectivity of each value in that table at a particular point in time. However, as time passes, many changes may significantly alter the values in the table, and consequently the selectivity of each those values. Also, full table scans are resource expensive. Thus, estimates of the selectivity of a predicate may be used instead of the actual selectivity of the predicate.

Once an estimate of the selectivity of a predicate associated with a cursor is determined, an associated selectivity range may be determined. According to one technique, the selectivity range is different for each selectivity value. For example, selectivity values below 0.01 have an initial selectivity range of +/−0.001. Selectivity values below 0.1 and greater than 0.01 have an initial selectivity range of +/−0.01. Selectivity values below 0.5 and greater than 0.1 have an initial selectivity range of +/−0.1. Selectivity values below 1.0 and greater than 0.5 have an initial selectivity range of +/−0.2.

As indicated previously, a selectivity range may change over time. One situation in which a selectivity range may change is when a selectivity of a predicate of a new query does not fall within a selectivity range of an old cursor or of any cursor in a cursor family (e.g., step 110). A hard parse is performed on the new query (e.g., step 114). The execution plan generated from the hard parse is compared to the execution plan of the old cursor or of any cursor in the cursor family (e.g., step 116). If the newly generated execution is substantially equivalent to one or more existing execution plans (e.g., identified in step 116), then the selectivity range of the corresponding cursor is amended to cover the selectivity of the predicate of the new query.

For example, if a selectivity of a predicate of a new query is 25% and a selectivity range of a child cursor (i.e., that has the same execution plan) is 5%-15%, then the selectivity range may be amended to be 5%-15%, 20%-30%. Alternatively, because there is a relatively small window between the discontinuous portions of the selectivity range, the selectivity range may be amended to be 5%-30%.

Adaptive Cursor Sharing

According to an embodiment of the invention, multiple cursor sharing techniques are used at different times to execute a set of semantically-equivalent queries. A database server gathers statistics about executing multiple semantically-equivalent queries using one cursor sharing technique. The database server determines that the statistics satisfy a particular condition. In response to the determination, the database server uses a different cursor sharing technique to execute subsequently-received queries that are semantically equivalent to the previous queries.

In one embodiment, one of the cursor sharing techniques is an existing cursor sharing technique that involves determining that a cursor has already been generated for previously-received semantically-equivalent queries and always using that cursor to execute subsequently-received semantically-equivalent queries. Such a cursor sharing technique is referred to hereinafter as "PCST."

In one embodiment, another of the cursor sharing techniques is an extended cursor sharing technique (as described previously). An extended cursor sharing technique also involves determining that a cursor has already been generated for previously-received semantically-equivalent queries. However, that cursor is only used if statistics gathered for the subsequently-received semantically-equivalent queries satisfy one or more criteria. Such a cursor sharing technique is referred to hereinafter as "ECST."

Determining Whether to Use a Different Cursor Sharing Technique

The statistics gathered during the executions of multiple semantically-equivalent queries when using one cursor sharing technique may indicate that that cursor sharing technique may not be as efficient in selecting a cursor as another cursor sharing technique. The type of statistics gathered is different depending on which cursor sharing technique is used first to determine which cursor to use to execute the queries.

In one embodiment, the first cursor sharing technique is PCST. PCST may be used initially to determine which cursor to use because ECST, as described previously, may incur unnecessary computation. For example, in some situations, even though a hard parse is performed on a new query, the resulting execution plan may be substantially equivalent to an existing execution plan. As another example, even though a new execution plan may be different than an existing execution plan, the amount of work (or time) required to execute the new query using the new execution plan may be (if less) insignificantly different than the amount of work required to execute the new query using an existing execution plan. Therefore, generating the new execution plan may not be warranted in multiple situations.

When PCST is the initial cursor sharing technique for a set of semantically-equivalent queries, the statistics gathered during execution of that set of queries may indicate how much "work" is performed during the executions. If the difference in the amount of work performed during various executions of semantically-equivalent queries is significant, then the cursor (or parent cursor) is "marked" to indicate that a different cursor sharing technique (such as an ECST) should be used to determine which cursor should be used to execute subsequently-received semantically-equivalent queries.

Many different metrics (or combinations thereof) may be used as a proxy of the amount of work performed. Non-limiting examples of such metrics include resource utilization (such as the number of CPU cycles and/or number of I/Os), clock time, and the number of blocks read from disk. Another example metric is the number of rows "produced" by each operator in the execution plan. For example, an execution plan of a query may require a join of two tables following a filter operation on the joined tables. A number of rows that result from the join operation are added to the number of rows that are remaining after the filter operation is applied. The sum is used as the amount of work performed to execute the query. In a related example, only the operators that are affected by the bind value(s) are monitored.

Another example metric is the number of blocks fetched from a buffer cache (e.g., in volatile memory) compared to the number of blocks fetched from disk. If that ratio is below a certain threshold, then the database server determines that a different cursor sharing technique (such as an ECST) should be used to determine which cursor to use to execute subsequently-received semantically-equivalent queries.

Executions that require a relatively large amount of work are referred to hereinafter as "expensive executions." Executions that require a relatively small amount of work are referred to hereinafter as "inexpensive executions."

After multiple executions are performed, the one or more metrics of each execution are used to determine whether the amount of work required for the multiple executions are different enough to warrant an ECST.

Processing Overview

Figure 3A:
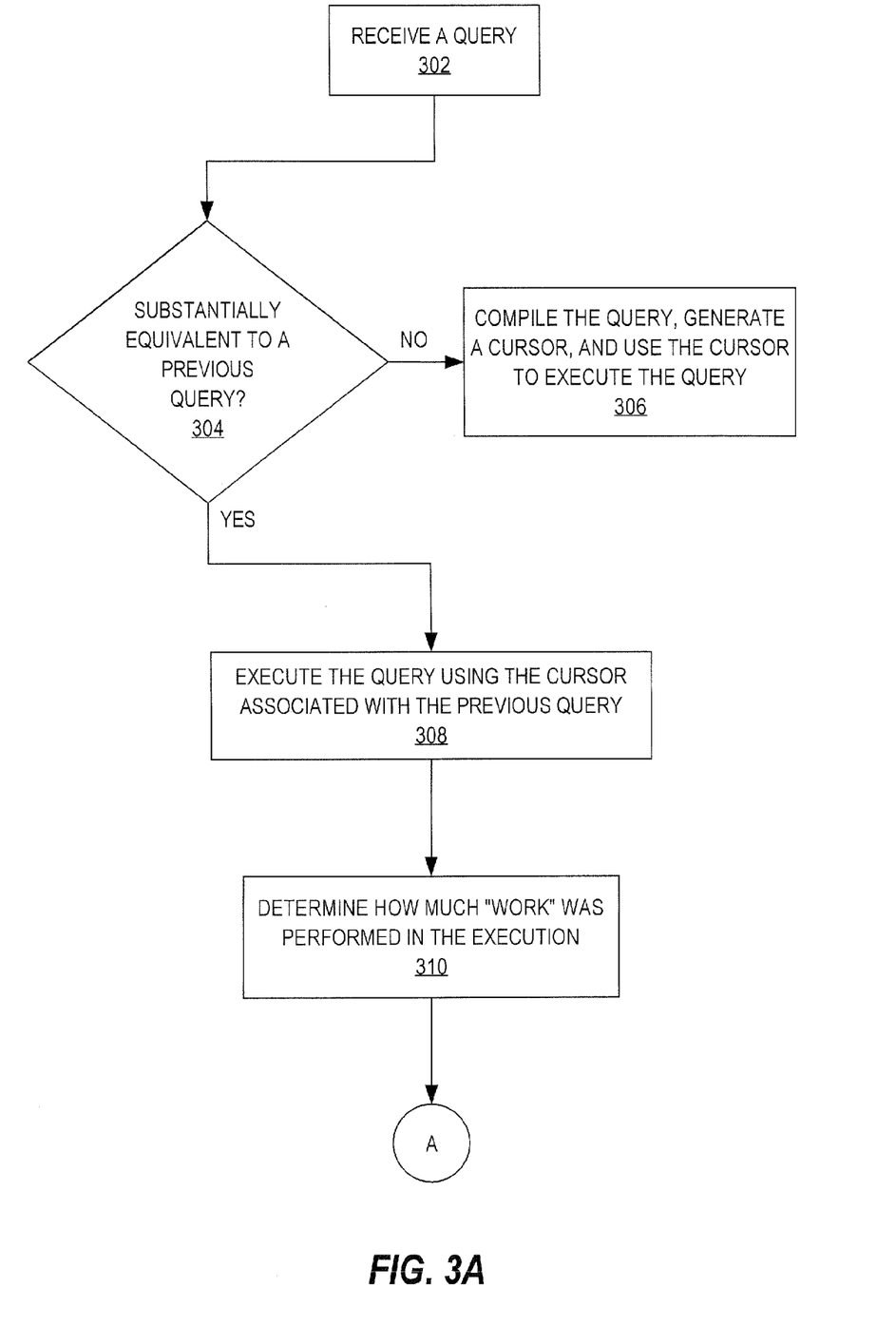
FIGS. 3A-B are flow diagrams that illustrate how a cursor may be shared using an adaptive cursor sharing approach, according to an embodiment of the invention.
Figure 3B:
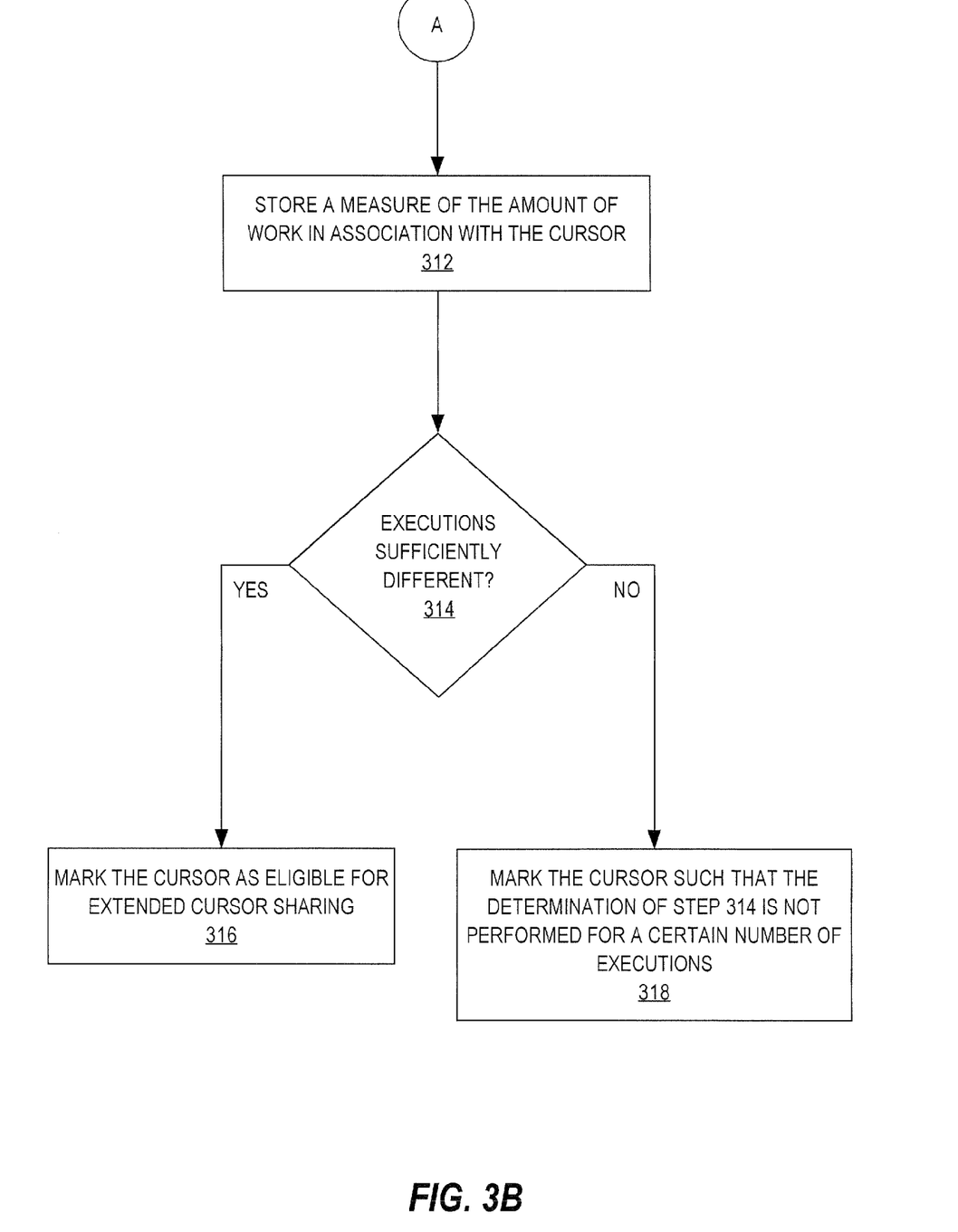

FIGS. 3A-B are flow diagrams that illustrate how a cursor may be shared using an adaptive cursor sharing approach, according to an embodiment of the invention. In the illustrated embodiment, a PCST is initially used to determine which cursor to use.

At step 302, a database server receives a new query.

At step 304, the database server determines whether the new query is semantically equivalent to a previous query. If not, then the process proceeds to step 306 where the database server compiles the new query, generates a cursor, and uses the cursor to execute the new query. If the determination at step 304 is positive, then the process proceeds to step 308.

At step 308, the database server executes the new query using the cursor generated for the previous query.

At step 310, the database server gathers one or more metrics about the amount of work performed to execute the new query.

Continuing to FIG. 3B, at step 312, the database server stores the one or more metrics in association with the cursor.

At step 314, after the database server executes multiple queries using the same cursor, the database server determines whether statistics gathered satisfy a particular condition. For example, the database server determines whether the amount of work required to perform one or more executions is sufficiently different enough from the amount of work required to perform one or more other executions. In one embodiment, this determination is performed after the second execution.

In a related embodiment, this determination is performed after a larger number of executions, such as ten executions. A rationale for waiting longer to perform the determination is to ensure that a large enough sample size of executions is performed so that a more intelligent determination might be made. For example, there may be a large set of inexpensive executions and only one expensive execution. The possible extra "cost" of extended cursor sharing (e.g., unnecessary hard parses) may still not be worth the savings in execution time for the one expensive execution.

If the determination at step 314 is positive, then, at step 316, the database server "marks" the cursor as eligible for an ECST. For example, an ECST flag associated with the cursor may be set to "false" as the default value. The extended cursor sharing flag, at step 316, may then be set to "true." Then, for subsequently-received queries that are semantically equivalent to the previous query (which also indicates that such queries are semantically equivalent the new query received at step 302), the database server will check to determine (i.e., before step 308) whether the extended cursor sharing flag is set to "true." If so, an ECST is used, such as an approach described previously with respect to FIGS. 1A-B.

If the determination at step 314 is negative, then, at step 318, the database server "marks" the cursor such that the determination at step 314 is not performed for a certain number of executions. This is done to avoid unnecessarily performing a substantial number of step 314 determinations.

In an embodiment, an execution number is associated with a cursor. The execution number indicates a number of executions in which a database server uses the cursor to execute a query before the database server performs the determination of step 314. After each execution, the execution number decrements. An initial execution number may be ten. When the execution number reaches zero, the database server performs the determination of step 314. If the determination is negative, then the execution number is set to ten again, or a higher value, such as 20. For each negative determination, the execution number may be, e.g., doubled or quadrupled from the previously set value.

Eventually, the database server may "mark" a cursor, with many negative determinations (such as twenty), as never available for an ECST. In such a case, the database server may determine after step 308 and before step 310 whether a cursor is so marked. If so, then the database server will not perform any of steps 310-316 with respect to that cursor.

However, in an alternative embodiment, the determination of step 314 is performed after each execution of a query associated with a particular cursor, in which case a negative determination at step 314 ends the process illustrated in FIGS. 3A-B.

Cursor States

As alluded to previously, a cursor may be associated with multiple states. For example, a cursor may be in a "monitored state" where cursor sharing is performed regardless of any bind values of different queries. While in a monitored state, a database server monitors multiple executions associated with the cursor and (at least occasionally) determines whether the cursor should be subject to an extended cursor sharing approach.

A cursor may also be in an "aware state" where an extended cursor sharing approach is performed with respect to the cursor.

A cursor may also be in a third state where cursor sharing is performed regardless of any bind values of different queries and without monitoring the executions that use that cursor.

Tracking the Distribution of the Amount of Work Associated with Different Executions In an embodiment, a set of "buckets" is maintained for each cursor in the monitored state. Each bucket represents a range of values for a particular metric or set of metrics. Each bucket is associated with a value that indicates a number of executions whose corresponding metric falls within the range of values represented by the corresponding bucket.

Figure 4:
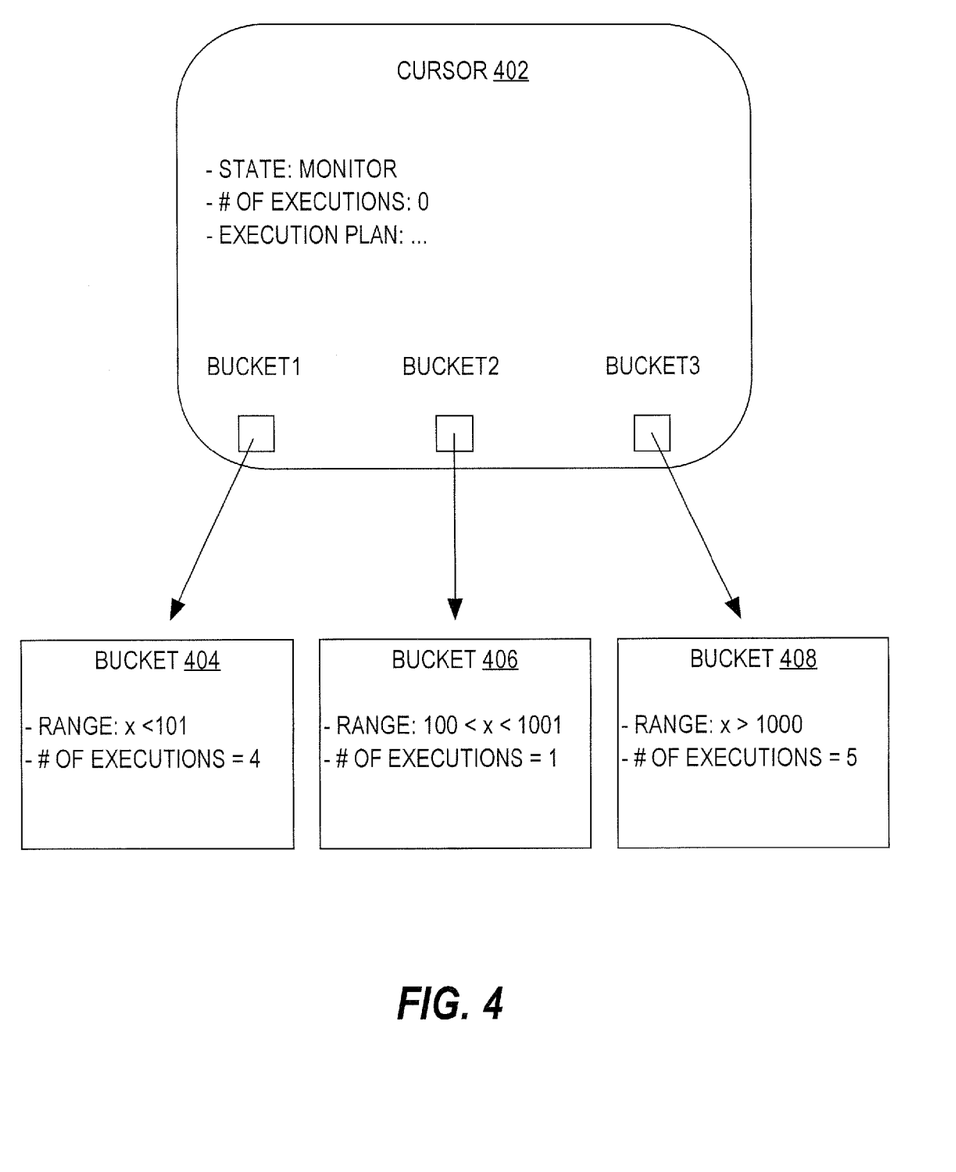
FIG. 4 is a block diagram that illustrates a cursor using an adaptive cursor sharing approach, according to an embodiment of the invention.

FIG. 4 is a block diagram that illustrates a cursor 402 using an adaptive cursor sharing approach, according to an embodiment of the invention. As FIG. 4 illustrates, cursor 402 is in the monitored state. Cursor 402 also indicates that the number of executions remaining before a determination is made whether to change the state of cursor 402 to the aware state is zero. Cursor 402 may also include an execution plan (not shown) that a database server uses to execute a particular query. In this example, a metric used to determine the amount of work performed to execute a query using cursor 402 is the number of rows produced by each operator in the execution plan.

As FIG. 4 further illustrates, cursor 402 is initially associated with three references (bucket1, bucket2, and bucket3) to three buckets: bucket 404, bucket 406, and bucket 408. The range of values associated with bucket 404 is effectively $0<x<101$. Thus, in order for an execution to be included in bucket 404, less than 101 rows must be produced by all operators in the execution plan. The range of values associated with bucket 406 is $100<x<1001$. The range of values associated with bucket 408 is $x>1000$.

Initially, the value of the number of executions indicated in cursor 402 was ten. After ten executions, the number of executions in bucket 404 is four, the number of executions in bucket 406 is one, and the number of executions in bucket 408 is five. Because (1) there is a relatively clear difference in the amount of work performed for the inexpensive executions in bucket 404 and the amount of work performed for the expensive executions in bucket 408 and (2) there is a similar number of executions in those two buckets, the database server may determine to change the state of the cursor from the monitored state to the aware state.

The number of buckets associated with a cursor is not required to be static through the lifetime of a cursor. The number of buckets may increase or decrease over time. For example, a cursor may initially be associated with ten buckets. After ten executions of queries associated with the cursor, the ten executions may be primarily in the first bucket and the last bucket. Subsequently, one half of the "middle" buckets may be merged with the first bucket and the other half of the middle buckets may be merged with the last bucket.

As another example, a cursor may initially be associated with three buckets. After a few executions, all the executions may be in the last bucket, in which the range of values is greater than 1000 rows. In that case, the first two buckets are merged into the last bucket and, based on the number of rows associated with each execution represented by the original last bucket, the resulting last bucket is split to form five new buckets. The ranges of the three new buckets are, respectively, 0-1000 rows, 1001-5,000 rows, 5001-25,000 rows, 25,001-100,000 rows, and greater than 100,000 rows.

The number of initial buckets in all cursors is not required to be the same. For example, some queries occur more frequently than others. Thus, if it is known at the time of cursor creation that a cursor is associated with infrequently issued queries, then that cursor may initially be associated with relatively few buckets (e.g., three). Conversely, if it is known that a cursor is associated with frequently issued queries, then that cursor may initially be associated with relatively many buckets (e.g., twenty).

Determining Whether to Use a Different Cursor Sharing Technique (Cont.)

In an alternative embodiment, an ECST is initially used to determine which cursor to use to execute a set of semantically-equivalent queries. As stated previously, the statistics gathered by the database server when a PCST is initially used for a set of semantically-equivalent queries may be different than the statistics gathered when an ECST is used.

For example, statistics gathered under an ECST may include a number of "unnecessary" hard parses. An example of an unnecessary hard parse is one in which an execution plan was generated for a new query that is substantially equivalent to an existing execution plan.

Another example of an unnecessary hard parse is when the amount of work required to execute one query using one cursor is roughly equivalent to the amount of work required to execute a semantically-equivalent query using a different cursor. In this case, the database server may be generating a number of child cursors that do not provide a significant improvement (i.e., decrease) in the amount of work performed during execution.

After a threshold number of unnecessary hard parses, the database server "turns off" the ECST with respect to the cursor (e.g., by changing the state of the cursor to the monitored state). For subsequently-received semantically-equivalent queries, the database server uses a PCST.

In one embodiment, the database server may determine that the initial cursor sharing technique performed "better" than a current cursor sharing technique. For example, a database server may determine that, under a PCST, execution of a first set of semantically-equivalent queries required less system resources than execution of a second set of queries (that were subsequently received and semantically equivalent to the first set) that used an ECST. Thus, the database server switches back to the PCST.

Hardware Overview

Figure 5:
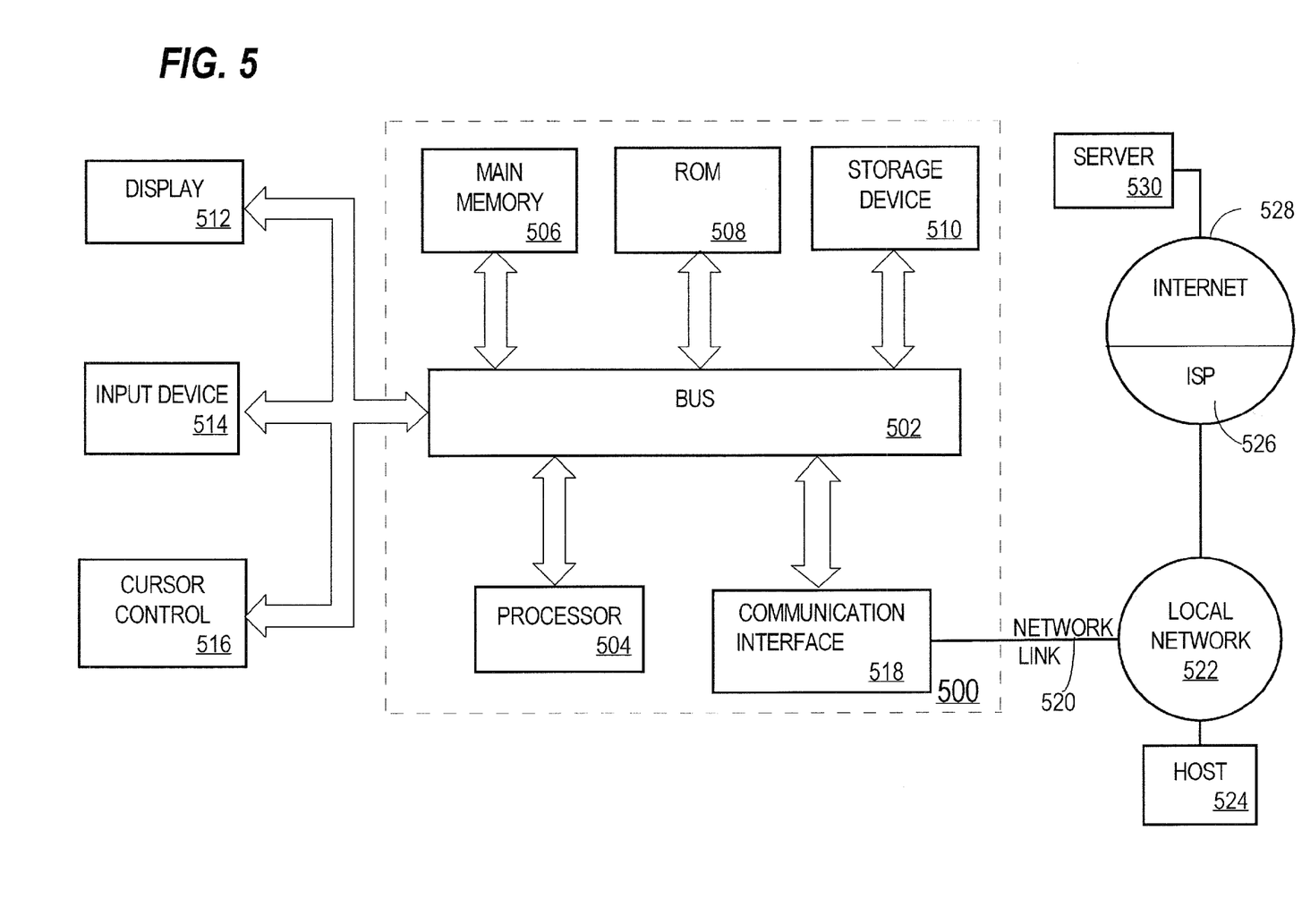
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   generating a cursor for a previous query;
   wherein generating the cursor for the previous query includes generating an execution plan for the previous query that is based, at least in part, on a first characteristic that is present at a time when the cursor is generated for the previous query;
   wherein the first characteristic reflects at least one factor, independent of the previous query itself, that has an effect on the execution plan produced for the previous query;
   storing, in association with the cursor, first data that indicates the first characteristic;
   receiving a current query;
   in response to receiving the current query, determining whether the current query is semantically equivalent to the previous query;
   determining second data that indicates a second characteristic, present at a time when the current query is processed, that would have an effect on an execution plan of the current query if such an execution plan were to be generated for the current query;
   wherein the second characteristic reflects at least one factor independent of the current query itself;
   performing a comparison between the first data and the second data;
   when the current query is semantically equivalent to the previous query, determining, based on the comparison of the first data and the second data, whether compiling the current query would produce an execution plan that satisfies certain criteria; and
   in response to determining that compiling the current query would produce an execution plan that satisfies the certain criteria, executing the current query using the cursor that was previously generated for the previous query.

2. The method of claim 1, wherein the current query and the previous query include one or more bind variables.

3. The method of claim 1, wherein the certain criteria is that the execution plan that would be generated for the current query would be substantially equivalent to the execution plan associated with the cursor that was previously generated for the previous query.

4. The method of claim 1, further comprising:
   in response to determining that compiling the current query would not produce an execution plan that satisfies the certain criteria, generating a current cursor for the current query.

5. The method of claim 4, further comprising:
   determining that an execution plan associated with the current cursor satisfies the certain criteria; and
   executing the current query using the cursor that was previously generated for the previous query.

6. The method of claim 4, further comprising:
   determining that an execution plan associated with the current cursor does not satisfy the certain criteria; and
   executing the current query using the current cursor that was generated for the current query.

7. The method of claim 1, wherein the cursor that was generated for the previous query is associated with one or more other cursors that were generated based on one or more queries that are semantically equivalent to the previous query.

8. The method of claim 1, wherein:
   the first characteristic is a first selectivity of a predicate in the previous query;
   the first selectivity indicates at least an estimate of a percentage of data items in a database object that satisfy the predicate in the previous query; and
   the second characteristic is a second selectivity of a predicate in the current query; and
   the second selectivity indicates at least an estimate of a percentage of data items in the database object that satisfy the predicate in the current query.

9. The method of claim 8, wherein determining whether compiling the current query would produce an execution plan that satisfies certain criteria includes determining whether the second selectivity is within a particular range of the first selectivity.

10. The method of claim 1, wherein the first characteristic is one or more of database workload, resource utilization, buffer cache statistics, or the number of processes that were allocated to processing the previous query.

11. One or more volatile machine-readable media or non-volatile machine-readable media comprising memory and storing instructions which, when executed by one or more processors, cause:
    generating a cursor for a previous query;
    wherein generating the cursor for the previous query includes generating an execution plan for the previous query that is based, at least in part, on a first characteristic that is present at a time when the cursor is generated for the previous query;
    wherein the first characteristic reflects at least one factor, independent of the previous query itself, that has an effect on the execution plan produced for the previous query;
    storing, in association with the cursor, first data that indicates the first characteristic;
    receiving a current query;
    in response to receiving the current query, determining whether the current query is semantically equivalent to the previous query;
    determining second data that indicates a second characteristic, present at a time when the current query is processed, that would have an effect on an execution plan of the current query if such an execution plan were to be generated for the current query;
    wherein the second characteristic reflects at least one factor independent of the current query itself;
    performing a comparison between the first data and the second data;
    when the current query is semantically equivalent to the previous query, determining, based on the comparison of the first data and the second data, whether compiling the current query would produce an execution plan that satisfies certain criteria; and
    in response to determining that compiling the current query would produce an execution plan that satisfies the certain criteria, executing the current query using the cursor that was previously generated for the previous query.

12. The one or more volatile machine-readable media or non-volatile machine-readable media of claim 11, wherein the current query and the previous query include one or more bind variables.

13. The one or more volatile machine-readable media or non-volatile machine-readable media of claim 11, wherein the certain criteria is that the execution plan that would be generated for the current query would be substantially equivalent to the execution plan associated with the cursor that was previously generated for the previous query.

14. The one or more volatile machine-readable media or non-volatile machine-readable media of claim 11, wherein the instructions, when executed by the one or more processors, further cause:
in response to determining that compiling the current query would not produce an execution plan that satisfies the certain criteria, generating a current cursor for the current query.

15. The one or more volatile machine-readable media or non-volatile machine-readable media of claim 14, wherein the instructions, when executed by the one or more processors, further cause:
determining that an execution plan associated with the current cursor satisfies the certain criteria; and
executing the current query using the cursor that was previously generated for the previous query.

16. The one or more volatile machine-readable media or non-volatile machine-readable media of claim 14, wherein the instructions, when executed by the one or more processors, further cause:
determining that an execution plan associated with the current cursor does not satisfy the certain criteria; and
executing the current query using the current cursor that was generated for the current query.

17. The one or more volatile machine-readable media or non-volatile machine-readable media of claim 11, wherein the cursor that was generated for the previous query is associated with one or more other cursors that were generated based on one or more queries that are semantically equivalent to the previous query.

18. The one or more volatile machine-readable media or non-volatile machine-readable media of claim 11, wherein:
the first characteristic is a first selectivity of a predicate in the previous query;
the first selectivity indicates at least an estimate of a percentage of data items in a database object that satisfy the predicate in the previous query;
the second characteristic is a second selectivity of a predicate in the current query; and
the second selectivity indicates at least an estimate of a percentage of data items in the database object that satisfy the predicate in the current query.

19. The one or more volatile machine-readable media or non-volatile machine-readable media of claim 18, wherein determining whether compiling the current query would produce an execution plan that satisfies certain criteria includes determining whether the second selectivity is within a particular range of the first selectivity.

20. The one or more volatile machine-readable media or non-volatile machine-readable media of claim 11, wherein the first characteristic is one or more of database workload, resource utilization, buffer cache statistics, or the number of processes that were allocated to processing the previous query.

* * * * *

UNITED STATES PATENT AND TRADEMARK OFFICE
CERTIFICATE OF CORRECTION

| | | |
|---|---|---|
| PATENT NO. | : 7,702,623 B2 | Page 1 of 1 |
| APPLICATION NO. | : 11/831951 | |
| DATED | : April 20, 2010 | |
| INVENTOR(S) | : Allison W. Lee et al. | |

It is certified that error appears in the above-identified patent and that said Letters Patent is hereby corrected as shown below:

In column 16, line 17, in claim 8, after "previous query;" delete "and".

Signed and Sealed this
Twelfth Day of April, 2011

David J. Kappos
*Director of the United States Patent and Trademark Office*